United States Patent

[11] 3,540,698

| [72] | Inventors | Frederick R. McFarland;<br>Walter L. Diffenderfer, Lancaster,<br>Pennsylvania |
|---|---|---|
| [21] | Appl. No. | 709,270 |
| [22] | Filed | Feb. 29, 1968 |
| [45] | Patented | Nov. 17, 1970 |
| [73] | Assignee | K-D Manufacturing Company<br>Lancaster, Pennsylvania<br>a corporation of Pennsylvania |

[54] TOOL FOR SEPARATING BRAKE SHOES
4 Claims, 5 Drawing Figs.

[52] U.S. Cl. .................................................. 254/100,
29/257
[51] Int. Cl. ..................................................... B66f 3/36
[50] Field of Search .......................................... 254/100;
269/321(B); 29/227, 233, 239, 256, 257, 229, 222;
81/Inq

[56] References Cited
UNITED STATES PATENTS

| 1,832,606 | 11/1931 | Zimmerman | 29/239|X |
| 2,498,937 | 2/1950 | Barrett | 269/321 |
| 2,695,649 | 11/1954 | Tilden I | 269/321(B)UX |
| 3,169,017 | 2/1965 | Tilden II | 269/321(B)UX |
| 3,426,752 | 2/1969 | Laico | 29/239X |

Primary Examiner—Robert C. Riordon
Assistant Examiner—David R. Melton
Attorney—Paul and Paul ABSTRACT: A tool is provided, for engaging adjacent ends of brake shoes in the vicinity of the star nut adjustment mechanism associated with automotive brakes, to facilitate installation and removal of the star nut adjustment mechanism during installation or replacement of brake shoes. The device includes fingers which engage, preferably between lowermost ends of brake shoes, the fingers being capable of being driven apart by rotating a threaded member associated with each of the fingers.

Patented Nov. 17, 1970

INVENTORS.
Frederick R. McFarland
Walter L. Diffenderfer

BY

Paul + Paul
ATTORNEYS.

Patented Nov. 17, 1970 3,540,698

INVENTORS.
Frederick R. McFarland
Walter L. Diffenderfer
BY

Paul + Paul
ATTORNEYS.

TOOL FOR SEPARATING BRAKE SHOES

BACKGROUND OF THE INVENTION

In the automotive industry, it is common practice to replace brake shoes on automobiles, often several times during the lifetime of a car, such brake shoe replacement being necessitated by normal wear occasioned under routine driving conditions.

In the course of effecting a brake shoe replacement, it has, in the past, been commonplace to leave the star nut adjustment mechanism in engagement against brake shoe ribs during disassembly of the shoes from a brake backing plate, at least until the brake shoe tensioning springs have been removed to relieve the tension which holds the shoes in secure engagement against the star nut adjustment mechanism and to permit removal of the shoes from their rib engagement behind the spring mounting pin disposed diametrically opposite the star nut adjustment mechanism. Special tools have been developed for removing the brake shoe tensioning springs from the spring mounting pin, in order to relieve the tension from the brake shoes and permit their disassembly and such tools have facilitated the removal of brake shoes in such a manner to a relatively satisfactory degree.

However, when a replacement set of brake shoes is to be installed, it has been and presently is necessary to first engage the lowermost rib portions of the brake shoes with the star nut adjustment mechanism and to assemble the shoes and the adjustment mechanism as a unit onto the brake backing plate, an operation which is often difficult, in that it is necessary to hold these several components and others, in position, while the brake shoe tensioning springs are installed and are connected to the spring mounting pin. Because of the many components that must simultaneously be maintained in position during this procedure, it has frequently resulted that, when one hand was released from a shoe to grasp a tool for assembling the brake shoe tensioning springs onto the spring mounting pin, the star nut adjustment mechanism often dropped out of its position of engagement of the brake shoe ribs, thereby retarding brake shoe assembly efficiency by complicating working conditions.

Various types of devices, such as pliers and the like are known for separating members, but none have ever been successfully developed for separating brake shoes, and particularly for separating brake shoes for facilitating removal and installation of star nut adjustment mechanisms.

SUMMARY OF THE INVENTION

The present invention seeks to eliminate this deficiency in the prior art, in providing a novel tool for facilitating removal and installation of star nut adjustment mechanisms, by spacing brake shoes, either by separating the shoes, or allowing the shoes to approach one another, whereby the tool may be carried by the ends of the brake shoes, and need not continually occupy the hand of a mechanic, but will maintain the desired spacing of the brake shoes, until the star nut adjustment mechanism can be properly inserted. Furthermore, the device is readily manually actuable and provides a "jacking" effect, by rotating a threaded member through one of a pair of fingers, the fingers being guided in their relative spacing movements.

Accordingly, it is a primary object of this invention to provide a novel tool for driving opposed members to a predetermined relative spacing, wherein the tool utilizes a pair of fingers which are laterally separable, and which are mounted for guided movement toward and away from one another upon manual actuation of a jacking means.

It is another object of this invention to accomplish the above object, wherein the tool is particularly adapted for separating brake shoes for removal and installation of the star nut adjustment mechanism.

It is a further object of this invention to accomplish the object set forth immediately above, wherein notches or similar means are provided on the fingers for engagement of brake shoe flanges or the like by the fingers, for maintaining the tool in position, carried by the brake shoes.

It is yet another object of this invention to accomplish all of the above objects, wherein the fingers are guided in their movement relative to one another by connection means carried by one of the fingers, disposed in sliding engagement in a slotted means carried by another of the fingers.

It is another object of this invention to accomplish all of the above objects, wherein the jacking is effected by manually grasping and turning a threaded member.

It is a further object of this invention to provide a brake shoe separating tool which may be economically manufactured, preferably using a plurality of stamped and bent sheet metal parts.

Other objects and advantages of the present invention will become readily apparent to one skilled in the art, upon reading the following descriptions of the drawing figures, detailed description of the drawings, and the appended claims.

IN THE DRAWINGS

Figure 1:
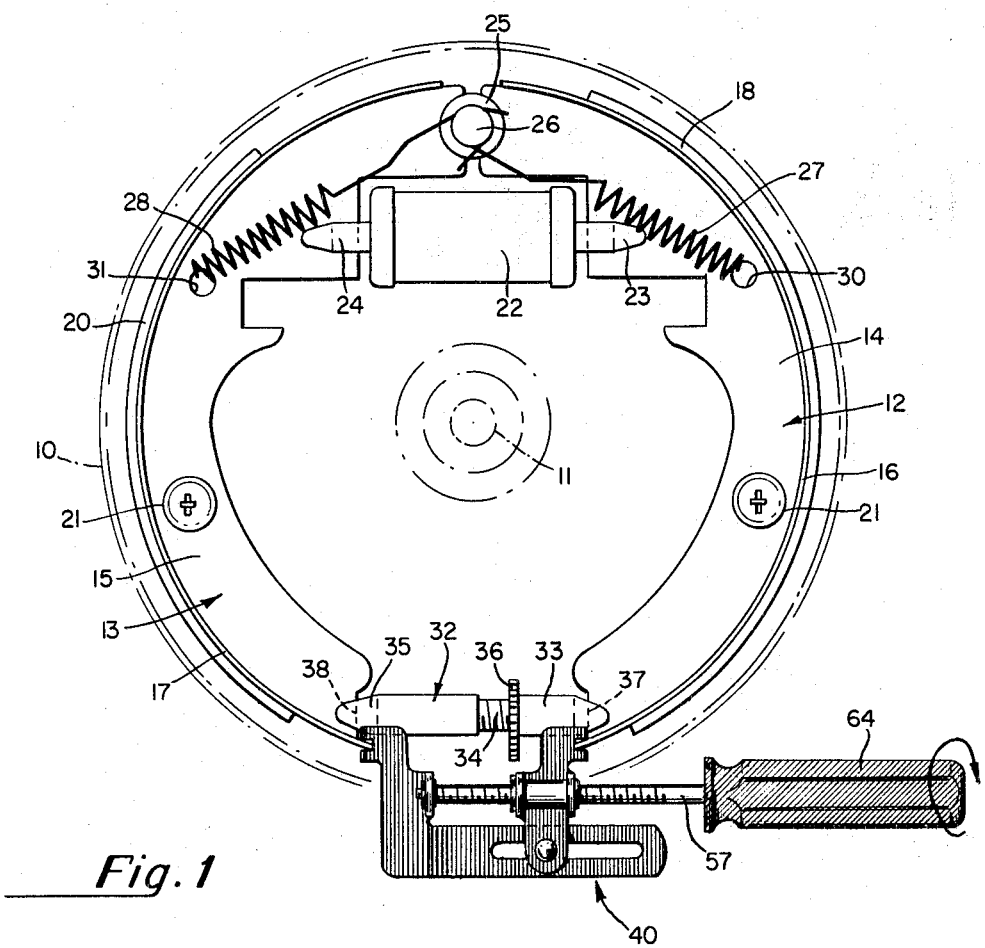
FIG. 1 is a front view of a pair of brake shoes and several of the essential brake shoe mounting components, illustrated in mounted position on a brake backing plate, with the tool of this invention disposed in position for separating the brake shoes and facilitating removal of the star nut adjustment mechanism.

Referring to the drawings in detail, reference is first made to FIG. 1, wherein there is illustrated, in phantom lines, the brake backing plate 10 of a typical automotive brake shoe installation, the backing plate 10 being carried at the end of an axle 11, also illustrated in phantom.

Right hand and left hand brake shoes 12 and 13, respectively, are provided, the brake shoes including respective ribs 14, 15, flanges 16, 17, and linings 18 and 20.

Associated with each of the brake shoes 12 and 13, is a conventional washer and spring arrangement 21 for holding down the brake shoes 12 and 13, by engaging their respective ribs 14 and 15, and limiting the movement of the shoes away from the backing plate 10 by such limited movement as is afforded by the compression of the springs associated with the washer and spring combinations 21.

A conventional brake cylinder 22 is disposed between the shoes 12 and 13, at their upper ends, the cylinder 22 having opposed pistons 23 and 24, in yokelike engagement against adjacent portions of the respective associated brake shoe ribs 14 and 15.

The uppermost ends of the brake shoes 12 and 13, are disposed with their ribs 14 and 15, in engagement behind a washer 25 carried by a spring mounting pin 26. The shoes 12 and 13 are thus free to pivot about the spring mounting pin 26, being urged toward one another by respective brake shoe tensioning springs 27 and 28, each of which is engaged about the spring mounting pin 26, and has an opposite end engaged within suitable holes 30 and 31 in the respective webs 14 and 15 of the shoes 12 and 13.

The lowermost ends of the shoes 12 and 13 are spaced by a star nut adjustment mechanism, generally designated by the numeral 32, which comprises a male member 33 having a threaded end 34 thereon, receivably threaded within a conventional female member 35, with a star nut 36 being carried by the male member 33, for controlling the degree of threaded engagement of the member 33 within the member 35, depending upon the setting of the star nut 36. The ends of the members 33 and 35 are generally of the yoke-shaped type, engaging opposite sides of the respective brake shoe ribs 14 and 15, with the ribs in abutment against slot bottoms 37 and 38, respectively. Thus, it is seen, that the springs 27 and 28 maintain the shoe ribs 14 and 15 in constant abutting engagement against the slot bottoms 37 and 38 of the star nut adjustment mechanism 32, regardless of the setting of the star nut 36.

The brake shoe separating tool 40 is illustrated in FIG. 1, in engagement with the brake shoes 12 and 13, in the vicinity of the star nut adjustment mechanism 32.

Figure 2:
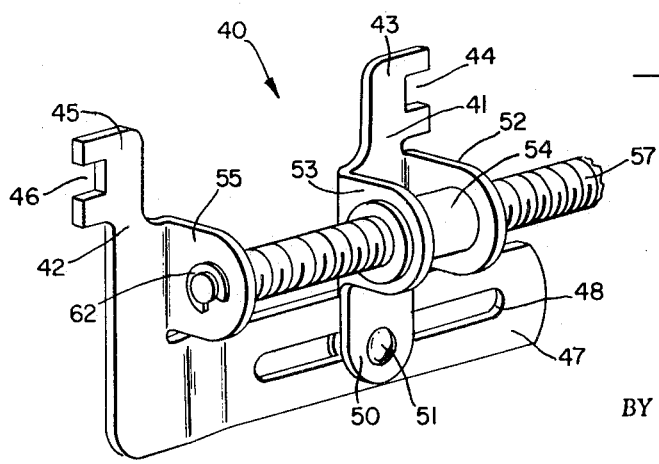
FIG. 2 is an enlarged fragmentary perspective view of a portion of the tool of this invention, wherein the particular details of construction of the fingers thereof are clearly illustrated.

With particular reference to FIG. 2, the tool 40 is illustrated as comprising a pair of aligned but laterally spaced fingers 41 and 42. The finger 41 has an uppermost, or free end portion 43 with an outwardly opening or slotted recess 44 therein, for engagement with the flange 16 of the brake shoe 12, with the recess 44 in the finger 41. Similarly, the finger 42 has an uppermost end 45, with a recess 46 therein, outwardly directed, in a direction opposite to that of the recess 44, for engagement with the flange 17 of the brake shoe 13.

The finger 42 is generally of L-shaped configuration, and includes a leg 47 having a longitudinally disposed slotted hole 48 therein. The lowermost end portion 50 of the finger 41 has a connection means attached thereto, in the form of a rivet 51, which is slidably received within the slotted hole 48 of the finger portion 47. The slotted hole and rivet combination therefore facilitate guiding of the fingers 41 and 42, during relative movement of the fingers.

Figure 3:
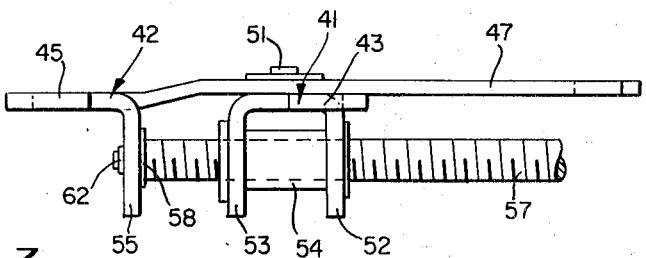
FIG. 3 is a top view of the tool portion illustrated in FIG. 2, further illustrating the construction of the fingers of the tool of this invention.

With particular reference to FIG. 3, it is to be noted that the uppermost or free end portions 43 and 45, respectively, of the fingers 41 and 42 are disposed in the same general plane, the finger 42 being bent slightly out of the plane of its lowermost portion 47, in order to facilitate the presence of the free end portions 43 and 45 of the fingers 41 and 42, respectively, in the same plane.

A pair of protruding lugs 52 and 53, are carried by and bent outwardly from the finger 41, to a position normal to the major portion of the fingers 41, and receive a threaded sleeve 54 therebetween.

A lug 55 is also bent normally to the major portion of the finger 42, and has a hole 56 therein.

A threaded member 57, comprising a piece of threaded stock is received within the lugs 52, 53 and 55, being threadably engaged within the sleeve 54 carried between the lugs 52 and 53, and being rotatably received within the bore or hole 56 of the lug 55. A washer 58, which may be hardened if desired, provides a suitable abutment surface for a larger diameter abutment end 60 of the threaded portion of the threaded member 57, with the left-most end 61 of the threaded member 57 protruding through the hole 56, and being secured therein by a suitable lock washer 62 resiliently engaged within an annular groove 63 thereof.

Figure 4:
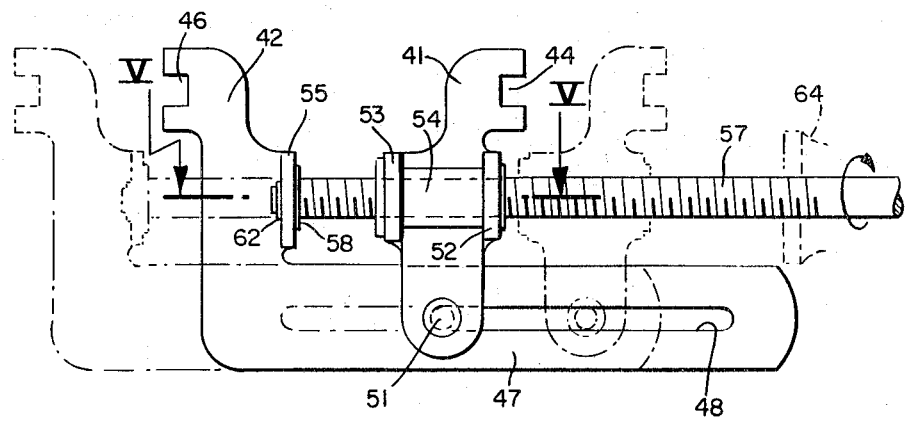
FIG. 4 is a front view of the fragmentary portion of the tool of this invention illustrated in FIG. 2, with the full lines and phantom positions of the fingers designating, respectively, closely spaced and more widely spaced positions of the fingers.
Figure 5:
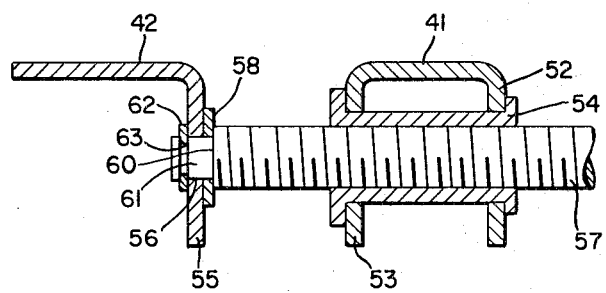
FIG. 5 is a longitudinal sectional view through the tool of this invention, taken generally along the line V-V of FIG. 4, and wherein the manner of connection of the threaded member to each of the fingers is clearly illustrated.

The right-most end of the threaded member 57 has a manually actuable handle 64, secured thereto which, when rotated in the direction designated by the arrow at the right side of FIG. 1, is operative to move the fingers 41 and 42 of the tool 40 to positions of relative separation from one another, as for example from the full line positions illustrated in FIG. 4, to the phantom line positions illustrated therein.

Upon rotating the handle 64 in a direction opposite to that of the arrows illustrated in FIGS. 1 and 4, the fingers 41 and 42 are moved axially toward one another, to permit the lowermost ends of the brake shoes 12 and 13 to more closely approach one another.

During the installation of brake shoes 12 and 13, the shoes may first be installed at their upper ends about the spring mounting pin 26, and the springs 27 and 28 may then be connected. At this point, the lowermost ends of the shoes 12 and 13 may closely approach one another, but upon insertion of the tool 40 between the shoes 12 and 13, with the oppositely opening grooves 44 and 46 thereof in engagement with lowermost portions of the respective flanges 16 and 17, and upon rotation of the handle 64, the lowermost ends of the shoes 12 and 13 are gradually separated. When the separation reaches a desirable limit, the star nut adjustment mechanism 32 may then be installed, and, while making such an installation, the tool 40 will remain in position, and need not be manually retained in position by the operator, but will maintain the desired separation of the shoes 12 and 13 due to the forces exerted by the springs 27 and 28, which in turn force the lowermost ends of the shoes 12 and 13 into abutting engagement within the recesses 44 and 46 of the respective fingers 41 and 42.

While the fingers 41 and 42 of this invention are disclosed as being of sheet metal construction, it is to be noted that various modifications may be made in the materials, and in the structural details of the tool 40 of this invention, as well as in the use thereof, without departing from the spirit and scope of the invention, as defined in the appended claims.

The "Abstract of the Disclosure" as set forth herein is intended to be a nontechnical description of the disclosure attendent to this invention, in order to comply with the Rules of Practice of the U.S. Pat. Office and is in no way intended to limit the scope of the invention.

We Claim:

1. A tool for separating adjacent ends of brake shoes which are resiliently urged toward each other, comprising a pair of fingers disposed alongside and laterally separable from one another, a free end of each said finger having slotted brake shoe engaging means thereon, said slotted means opening in opposite directions facing away from each other, other ends of said fingers having guiding means thereon, said guiding means comprising a laterally extending member disposed normal to the disposition of said fingers and having an elongated slot therein, with said laterally extending member being integral with a first said finger, and with said guiding means also comprising a connector carried by a second said finger, said connector being engaged within and slidable in said slot, jacking means being provided carried by said fingers for forcibly separating said fingers, upon actuation.

2. The tool of claim 1, wherein said jacking means comprises a threaded member carried by said fingers spaced from but parallel to said slotted laterally extending member, with said threaded member being mounted at a first end for rotation in but against lateral movement relative to said first finger and being mounted in threaded engagement with a complementally threaded member carried by said second finger, with said threaded member being provided with a manually engageable handle at its second end.

3. The tool of claim 2, wherein said fingers are substantially flat coplanar members and are provided with integral lugs protruding outwardly of their plane in carrying engagement with said threaded member and said complementally threaded member.

4. The tool of claim 3, wherein said fingers, lugs and laterally extending member are of sheet metal construction.